United States Patent [19]
Plisky et al.

[11] 3,875,611
[45] Apr. 8, 1975

[54] PIN HOLE EMBOSSMENT

[75] Inventors: John J. Plisky, Munster, Ind.; John P. Moorhead, Palos Verdes, both of Calif.

[73] Assignee: The Anderson Company, Gary, Ind.

[22] Filed: Aug. 22, 1973

[21] Appl. No.: 390,609

[52] U.S. Cl. .............................................. 15/250.32
[51] Int. Cl. ................................................ B60s 1/40
[58] Field of Search........ 15/250.32, 250.35, 250.42, 15/250.31, 250.34, 250.36

[56] References Cited
UNITED STATES PATENTS

| | | | |
|---|---|---|---|
| 3,588,942 | 6/1971 | Schlesinger | 15/250.32 |
| 3,717,900 | 2/1973 | Quinlan et al. | 15/250.42 |
| 3,750,227 | 8/1973 | Hayhurst et al. | 15/250.32 |

*Primary Examiner*—Peter Feldman
*Attorney, Agent, or Firm*—Wegner, Stellman, McCord, Wiles & Wood

[57] ABSTRACT

A wiper blade assembly having a pressure-distributing bridge member with spaced sides having aligned apertures is adapted for releasable connection with a wiper arm by insertion of a laterally extending pin at the end of the arm through the apertures. Embossments formed on the sides of the bridge adjacent the aperture provide a guide surface at the top edge of each embossment adjacent the aperture to facilitate insertion of an enlarged portion of the pin past a leading edge or shoulder on the pin. The guide surfaces are formed in such a way that the enlarged base portion of the pin adjacent the leading edge or shoulder is engaged at points increasingly spaced from each other as the pin is moved toward the aperture thus gradually increasing the guiding restraint thereon and precluding abutment of the leading edge or shoulder against the edge of the aperture which abutting would prevent further insertion of the pin.

17 Claims, 4 Drawing Figures

PIN HOLE EMBOSSMENT

BACKGROUND OF THE INVENTION

This invention relates to a side-mounted windshield wiper blade assembly releasably attachable to the side of a windshield wiper arm by means of a pin at the end of the arm extending through apertures formed in the side of the blade assembly and, more particularly, to such an assembly with a guide for facilitating insertion of the pin into the aperture.

In side-mounted wiper blade constructions, it is desirable to provide a releasable connection between the wiper blade assembly and the wiper arm which will facilitate removal of a used wiper blade and replacement with a new blade. For such purposes, it has been conventional to provide a laterally extending pin on the wiper arm with a reduced central portion between an enlarged base portion and an enlarged end portion for receiving a releasable spring carried by the bridge member of the blade. However, in some prior art constructions, during mounting of the wiper blade assembly on the pin of the wiper arm, an inexperienced attendant may hear a click or feel a snap when the pin on the arm is only partially inserted into the wiper assembly and then incorrectly assumes that the wiper blade assembly is properly mounted. As a result of such misleading signals, the wiper blade assembly may be left improperly mounted on the wiper arm and thereafter become disconnected and lost during use. A fail-safe connection which will retain the wiper blade assembly on the wiper arm, even if the attachment may not be completed at the factory or by the service station attendant, has been provided as described in the application of Nichols et al. Ser. No. 312,209 entitled "Windshield Wiper Blade Connector," assigned to the assignee of the present invention.

The particular problem presented in fully inserting the pin is due in great part to the shoulder at the leading edge between the enlarged base portion and the reduced central portion abutting against the edge of the aperture in the bridge member rather than sliding therethrough The entrance to the aperture in the side of the bridge member substantially lies in a plane, and the shoulder at the leading edge of the pin lies similarly in a plane transverse to the direction of pin insertion and to the pin elongate axis. As the pin is inserted into the bridge member it is required that the plane of the side and the plane of the shoulder be perfectly parallel, otherwise the shoulder on the pin will engage the edge of the aperture thus hanging up the pin on the blade. It is then necessary to shift the blade relative to the pin until the leading edge of the pin aligns with the aperture so that the enlarged base portion of the pin can move into the aperture. It has been found that this difficulty can be slightly reduced by placing a radii on the shoulder at the leading edge between the base portion and central portion, but in a high percentage of cases the pin still is hung up on the entrance to the aperture in the blade.

Further complicating the problem is the requirement that both enlarged portions must fit snugly within their respective apertures in the bridge, however, when the restraining force of the edge of the one aperture in the remote wall of the bridge member acts on the enlarged end portion of the pin prevents manipulation of the enlarged base portion relative to the edge of the second aperture in the rear wall of the bridge member, it becomes difficult to align said enlarged base portion with the second aperture thereby preventing the two enlarged portions from snugly fitting within the apertures for proper assembly.

SUMMARY OF THE INVENTION

The present invention overcomes these aforementioned problems which prevented easy and proper insertion fashion is of the pin into the apertures of the wiper blade assembly by providing a guide to facilitate insertion of the pin into the apertures. More particularly, a guide surface is contoured on the support or bridge member of the wiper blade in such a fasion that the enlarged base portion on the pin adjacent to its leading edge or shoulder in engaged at points therealong increasingly spaced from each other as the enlarged base portion is moved toward the aperture, thus gradually increasing the guiding restraint thereon and preventing the leading edge or shoulder from abutting against the edge of the aperture in the wiper blade thereby hanging up the blade relative to the pin and arm.

Thus, the principal object of the invention is to provide an improved guide to facilitate insertion of a pin into an aperture therefor in the side of a bridge member of a wiper blade assembly.

In a preferred construction illustrated herein, the guide surface comprises the edge surface of an embossment formed on each side of the bridge member adjacent the aligned apertures through said bridge member. Preferably, each embossment lies along the surface of an imaginary cylinder transversely disposed with respect to the direction of pin insertion. The contour of the guide surface edge of each embossment, in the direction of pin insertion, conforms to the shape of the aperture in the bridge member and to the shape of the enlarged base portion of the pin.

Although part of the enlarged end portion of the pin is shown as being tapered to facilitate insertion into the one aperture initially, the forward face of the end portion may be flat, in which case the guide surface of the embossment would facilitate insertion of the enlarged end portion through the aperture, the edge of which aperture ultimately supports the enlarged base portion of the pin.

The guide surface of the embossment, in addition to providing a guiding action or restraint for the enlarged base portion of the pin during insertion into the bridge member, provides a bearing surface for the enlarged base portion after the pin has been completely inserted.

Although the guide surface of the embossment is only needed for the aperture through which the pin is first inserted, a guide surface is provided for both apertures on both sides of the bridge so that the wiper blade assembly which is symmetrical along its elongate axis may be used with wiper arms having pins projecting from either the left or right side of the arm.

BRIEF DESCRIPTION OF THE DRAWINGS

The foregoing features and advantages of the present invention will be made more apparent and further features and advantages will be set out in the following description of the preferred embodiment taken together with the accompanying drawings in which.

DESCRIPTION OF THE PREFERRED EMBODIMENT

Figure 1:
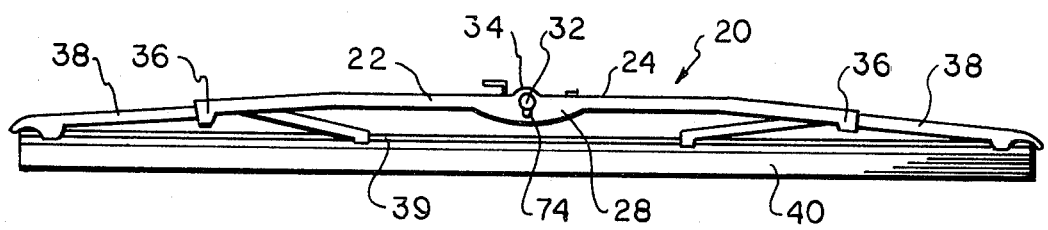
FIG. 1 is a side view of a windshield wiper blade assembly embodying the principles of the present invention.

Referring now to the drawings, FIG. 1 in particular, a windshield wiper blade assembly 20 embodying the principles of the present invention is shown as including a superstructure having an elongated pressure-distributing primary yoke or bridge member 22 which has in cross-section a channel shape including an upper wall 24 and depending spaced side walls 26 and 28 having formed therethrough aligned apertures 30 and 32, respectively. An upwardly protruding rounded portion 34 is formed in upper wall 24 to form the upper edges of the apertures 30, 32. Pivotally connected as at 36 at each end of bridge member 22 are secondary yokes 38. The end portions of the secondary yokes 38 are formed to slidably engage spaced portions of a backing strip 39 carried by a resilient wiping element 40. It is to be understood that the form of superstructure for the wiper blade assembly forms no part of this invention as long as the assembly includes a member to which the pin of a pin-type wiper arm is attached.

Figure 4:
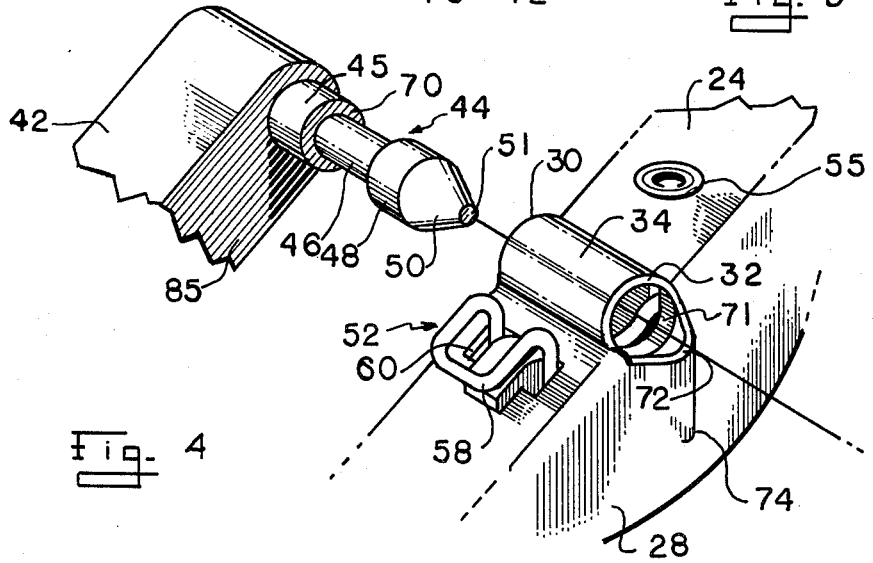

As shown in FIG. 4 at the free end of a wiper arm or wiper arm extension 42 is secured a laterally extending pin 44 which is adapted to be releasably attached to the side mounted wiper blade assembly 20. The pin 44 includes a reduced central portion 46 between an enlarged base portion 45 adjacent the wiper arm 42 and an outer end portion 48 which may have a tapered terminus 50 with a terminal face 51. The other end of the wiper arm 42 (not shown) has means for engagement with a shaft and a driving mechanism associated with a wiper driving motor in a manner to oscillate the wiper arm about the axis of the shaft in an appropriate arc depending upon the particular installation to move the wiper blade back and forth across the windshield.

Figure 2:
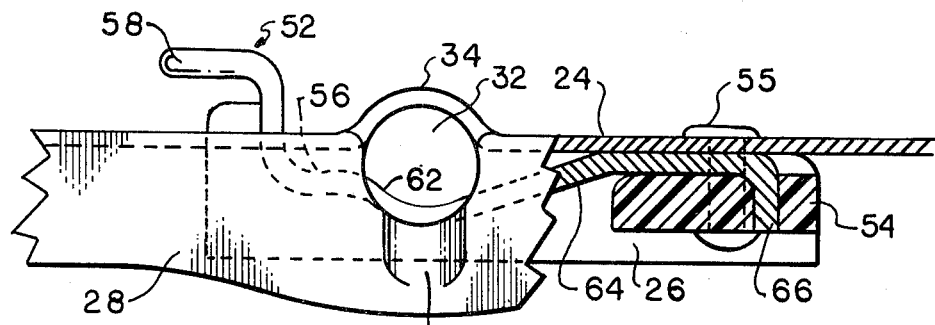
FIG. 2 is a fragmentary enlarged side view of the connector portion of the wiper blade assembly illustrated in FIG. 1.

The apertures 30,32 in the bridge 22 are adapted for receipt of the pin 44 therethrough to releasably connect the wiper blade assembly with the end of the wiper arm. The releasable characteristic of the attachment of the wiper blade assembly 20 to pin 44 may be provided by a U-shaped wire spring member 52 which is secured to bridge member 22 by means of a mounting block 54 and rivet 55, as is shown in FIG. 2. The U-shaped spring member 52 includes spaced, parallel leg portions 56 connected by a cross-piece or handle 58. The major part of each leg portion 56 is disposed within the channel-shaped mid-portion of bridge member 22, while the end portions of the legs 56 adjacent cross-piece or handle 58 project outwardly through an aperture 60 in upper wall 24 of bridge member 22, so that the cross-piece or handle 58 is manually accessible for manipulating the spring member. Each leg 56 has a curved portion 62 in alignment with the apertures 30,32 in the bridge 22 and is adapted to normally, resiliently engage the reduced central portion 46 of pin 44 to securely hold the wiper blade assembly on the wiper arm. Each spring leg 56 includes an end portion 64 adapted to be captured between the mounting block 54 and upper wall 24 and a downturned portion 66 adapted to be anchored in the mounting block when said rivet 55 is in place. To permit insertion of the pin 44 through the apertures 30,32 in the bridge, the mounting block includes a transverse bore 71 aligned with the apertures, with the walls of the bore 71 providing additional support for the enlarged portion 45, 48 of the pin 44.

In its unflexed condition, spring legs 56 are normally disposed with their curved portion 62 lying in the insertion path between the apertures 30,32 as shown in FIG. 2. When the wiper blade assembly is to be attached to the pin on the arm, the spring 52 may be depressed either by hand to move portion 62 out of the path of insertion of the pin or by means of the bevelled end portion 50 of the pin being inserted through the aperture 30 or 32 in the walls 26, 28 of the bridge member in a manner such that the spring is urged aside as the pin passes toward a fully inserted position. When the spring 52 is depressed by hand, the pin 44, assuming no hang ups on shoulders 70 of the pin, can be pushed home in the connector of the bridge. When thus fully inserted, the curved portions 62 of the spring 52 engage in the reduced central portion 46 of the pin to latch the blade to the arm.

When the tapered portion 50 of the pin 44 is used to cam the spring 52 out of the path of insertion of the pin 44, the portion 48 of the pin will clear the curved portion 62 of the spring on one side whereupon the spring 52 will move into latched position spanning the portion 48. Continued pressure on the arm and pin 44 toward the blade, and assuming no hang ups on the shoulder 70 with the wall of the bridge, the tapered surface 50 will again cam the curved portion 62 of the spring 52 out of the path of insertion and the pin will be permitted to move to the home position whereupon the spring 52 will nest in the reduced portion 46 of the pin to latch the pin 44 to the blade.

The shoulder or leading edge 70 between base portion 45 and reduced central portion 46 lies in a plane transverse to the elongate axis of the pin as does the shoulder between end portion 48 and the central portion 46 such that when the spring 52 is in latched position in the pin 44 any attempted axial movement of the pin relative to the blade will not result in a camming action to force the spring 52 out of the latched position with the pin. Rather, axial removal of the pin is prevented by the curved portion 62 of spring 52 abutting against the shoulders 70.

When it is desired to remove the wiper blade assembly from the pin on the arm, pressure on the handle or cross-piece 58 of the spring 52 will move portions 62 out of the path of removal of the enlarged portions 45,48 whereupon the pin and arm can be moved laterally out of the bridge of the blade.

The end portion 48 of the pin 44 of the arm has a length approximately corresponding to the lateral space between legs 56 of the spring members at their curved portion 62, so that if the wiper blade assembly is only partly mounted on the pin of the arm, the end portion 48 may be captured between the spring legs 56 to retain the wiper blade assembly against loss even though incompletely mounted. The device thus provides a fail-safe feature which reduces losses experienced with prior art devices.

Frequently, during assembly, the assemblymen upon hearing a click when the first spring leg snaps off the edge of the end portion 48 onto central portion 46 will incorrectly assume that the pin has been completely inserted. Often compounding this false impression given to the assemblymen is the shoulder 70 between base portion 45 and central portion 46 abutting against or hanging up on the wall surrounding the aperture thereby preventing further insertion of the pin through the aperture. Although loss is prevented by the fail-safe feature, it is still desirable that the pin be fully inserted.

Thus, in accordance with the present invention, improved means are provided for facilitating insertion of the enlarged base portion 45 of the pin 44 into the aperture in the support or bridge of the blade. In prior wiper blade assemblies the wall surrounding the aperture 30 or 32 was substantially coplanar such that the leading edge or shoulder 70 of the enlarged base portion 45 of the pin often misaligned with the apertures 30,32 and would abut against or hang up on said planar wall adjacent the aperture rather than sliding therethrough. In addition to the hang up of the shoulder 70 on the planar wall 28 adjacent the aperture 32, the raised portion 34 in the top wall of the bridge presents a planar edge which forms the upper part of the aperture 32, said planar edge being spaced from the planar wall 28 and acts to engage shoulder 70 on the pin to hang up the pin on the blade. In the present invention this problem is substantially eliminated by the provision of a means for guiding the enlarged base portion 45 into the apertures 30 or 32 without hanging the leading edge or shoulder 70 up on the wall or edge adjacent said apertures. In a preferred embodiment, the guiding means comprises a guide surface 72 which is the top edge surface of an embossment 74 formed in the side walls 26 and 28 of the bridge member 22 adjacent a lower portion of the apertures 30,32 respectively. The walls of the embossment are integrally formed with the side walls of the bridge member 22 and support and maintain the guiding surface 72 in guiding relationship with appropriate apertures 30,32. It is to be understood that the embossment 74 could be a separate member or lug attached to the planar wall of the bridge member and which lug would have a guide surface in alignment with the apertures in the bridge member.

Figure 3:
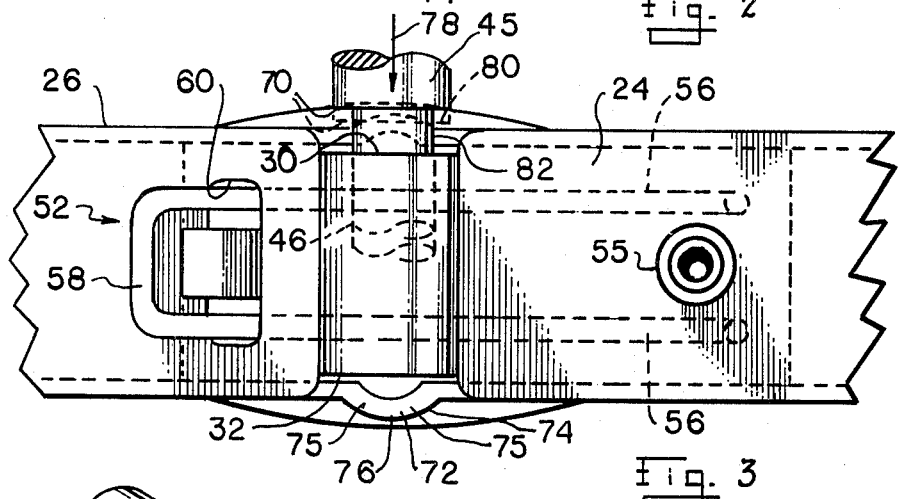
FIG. 3 is a plan view of the connector portion of the wiper blade assembly of FIG. 2; and, FIG. 4 is a schematic perspective view illustrating the configuration of the laterally extending pin at the end of the wiper arm and the manner of alignment for insertion thereof through the aperture of the wiper blade assembly.

As shown in FIG. 3, the guide surface 72 has two peripheral portions 75,75 spaced from the center axis of the aligned apertures 30,32 which portions gradually merge together at a point 76 spaced from the planar walls 26,28. The contour of the peripheral portions 75,75 viewed in a direction perpendicular to the direction of pin insertion may conform to a circular shape as shown in FIG. 3 with the point of merger comprising a tangent point of the circular shape. The guide surface 72 when viewed in the direction of pin insertion conforms in contour with that of the apertures 30,32 and portions 45,48 of the pin. In the embodiment shown, the apertures 30,32 are circular in shape, and thus the peripheral portions of the guide surface 72 lie along the surface of an imaginary cylinder along which also lie the edges of the apertures 30,32. The apertures 30,32 could have a different shape, such as elliptical, in which case the guide surface 72 would have a conforming shape.

Although the embossment 74 is depicted as having a circular shape viewed in a direction transverse to pin insertion, any other shape could be utilized so long as it is of such a form that the enlarged base portion 45 of the pin adjacent its leading edge or shoulder 70 is engaged first along a small portion thereof (or a point) and is then engaged at points increasingly spaced from each other as the enlarged base portion 45 is moved towards the aperture, thus gradually increasing the guiding restraint thereon. As shown in FIG. 3, as the base portion 45 is moved in the direction of arrow 78 toward the aperture, the base portion 45 adjacent leading edge 70 is first engaged by guide surface 72 at or near point 76 spaced from the aperture where the two peripheral portions 75,75 merge together. As the base portion 45 is moved further in the direction of arrow 78 toward the aperture, the points at which it is engaged by the guide surface 72 become increasingly spaced from each other such as at points 80 and 82 when the leading edge is in the position shown in broken lines in FIG. 3. This non-planar guide surface presented to the base portion 45 prevents the tendency of the shoulder 70 to abut the flat or planar wall surface surrounding the aperture and hang up thereon, preventing full insertion of the pin. Identical guiding surfaces are provided for each of the apertures 30,32 so that the pin 44 may be inserted from either side of the bridge member.

In assemblying the blade 20 on the arm 42, the tapered surface 50 of the pin 44 is engaged with the guide surface 72 and urged into the aligned aperture 32. The end portion 48 passes into the connector until the shoulder or leading edge 70 approaches the embossment 74 whereupon the blade is canted slightly with respect to the pin until the bottom edge of the base portion 48 can be placed onto the guide surface 72 at or inboard from the point 76. The pin 44 is then urged toward the blade with the base portion 48 riding on the peripheral portions 75,75 of said guide surface 72 until leading edge or shoulder 70 clears the edge of aperture 32. A short additional movement of the pin 44 into aperture 32 of the blade will cause the latch spring 52 to snap into the reduced portion 46 of the pin to latch the pin and arm to the blade.

To remove the blade, the handle or cross-piece 58 of the spring 52 is depressed whereupon the blade can be backed off the pin on the arm.

While the foregoing pin 44 insertion facilitating means of the present invention has been described in conjunction with a particular embodiment of a wiper blade assembly which includes an improved retaining spring for the pin, it should be understood that the guide means can be readily adapted for use with other types of wiper blade assemblies.

The embossment 74 further serves as a spacer between the side wall 85 of the wiper arm 42 and the side wall of the bridge of the wiper blade, thereby positioning the blade away from the arm enough to permit unimpeded articulation of the blade relative to the arm.

We claim:

1. A windshield wiper blade having at least one support member operatively connected to a wiping element, connector means carried by said support member for removably connecting said blade to a pin on a wiper arm and guide means for guiding said pin into latching connection with said connector means, said guide means comprising means projecting outwardly from the side of said connector means adjacent an aperture aligned with said connector means, said projecting means having a portion with a guide surface aligned with an edge of the aperture, said portion of the projecting means being offset laterally from an opposite edge of said aperture whereby a base portion defining a transverse shoulder on said pin is cradled on said guide surface of said portion of the projecting means which surface guides the pin into the connector means.

2. A wiper blade as claimed in claim 1 wherein said connector means is an integral part of said support member.

3. A wiper blade as claimed in claim 2 wherein the projecting means is an embossment formed outwardly in the side wall of the support member immediately below the pin receiving aperture, the top edge of said embossment in the plane perpendicular to the axis of said embossment forms said guide surface and is shaped to generally conform to the outer contour of the base portion of said pin whereby said top edge will guide said base portion into said aperture.

4. A wiper blade as claimed in claim 3 wherein both side walls of said support member have embossments, each embossment having said guide surface in alignment with the aperture formed in the appropriate side wall whereby the blade may be assembled with the pin from either side of said blade.

5. A wiper blade as claimed in claim 1 wherein said projecting means serves as a bearing spacer between the arm end and the connector means of the blade.

6. In a windshield wiper blade assembly having a bridge member operatively connected to a wiping element, spring means carried by said bridge member for removably connecting said blade to a recessed portion of a pin on a wiper arm, and guide means on said bridge for guiding said pin into latching connection with said spring means, said guide means comprising an embossment projecting from one side wall of said bridge means adjacent an aperture aligned with said spring means, a top edge of said embossment being aligned with an edge of said aperture, a part of said embossment being offset outwardly from the plane of the edge of said aperture whereby a base portion defining said recessed portion of said pin is cradled in said part of said guide portion of the embossment which part serves to guide the pin into the connector means.

7. A wiper blade as claimed in claim 6 wherein said bridge means has aligned apertures formed in opposite side walls thereof, and each said side wall has one of said guide means aligned with the aperture in said side wall whereby the blade may be assembled with the pin on a wiper arm from either side thereof.

8. In a windshield wiper blade assembly having at least one bridge member operatively connected to a wiping element, said bridge member having a top wall and depending side walls, connector means carried by said bridge member for removably connecting said blade to a pin on a wiper arm and means for guiding said pin into latching connection with said connector means, said last-named means comprising embossment means projecting from one side wall of said bridge means adjacent an aperture formed in said side wall in alignment with said connector means, an upper surface of said embossment having a guide portion aligned with the lower edge of the aperture, said guide portion of said embossment being offset from the edge of the top wall of the bridge forming part of said aperture whereby a base portion defining a transverse shoulder on said pin is cradled in said guide portion of the embossment which guide portion serves to guide the pin into the connector means.

9. In a wiper blade assembly as claimed in claim 8 wherein each depending side wall has an aperture and an embossment with a guide portion aligned with said aperture.

10. In a windshield wiper blade assembly having a pressure-distributing member with spaced side walls having an aperture extending through at least one of said side walls adapted for connection with a wiper arm by receipt therethrough of a pin at the end of the arm, said pin having a portion which is substantially congruent with said aperture at a leading edge thereof, means for facilitating insertion of said pin, leading edge first, into said aperture, comprising: means for guiding said pin portion into the aperture, said guiding means having a guide surface which has a contour viewed in the direction of pin insertion which conforms with a portion of the aperture, said guide surface having two peripheral portions spaced from each other at said portion of the aperture on either side of the center thereof which gradually merge together at a point spaced from the aperture, said pin portion at its leading edge being engaged by said two peripheral guide portions first at the point where they are merged together and being engaged at points increasingly spaced from each other as the leading edge is moved toward the aperture thus gradually increasing the guiding restraint thereon.

11. The wiper blade assembly of claim 10 in which said pin has a reduced central portion between an enlarged end portion and an enlarged base portion adjacent the end of the wiper arm, said leading edge comprising a shoulder between said enlarged base portion and the reduced central portion.

12. The wiper blade assembly of claim 10 in which said peripheral portions viewed in a direction perpendicular to the direction of pin insertion conform to a circular shape with said point of merger comprising a tangent point of the circle.

13. The wiper blade assembly of claim 10 in which said guiding means is integral with said one side of the bridge member.

14. The wiper blade assembly of claim 13 in which said guide surface comprises the edge surface of an embossment formed on said one side of the bridge adjacent said aperture.

15. The wiper blade assembly of claim 10 in which said aperture is circular and said peripheral portions of the guide surface lie along the surface of an imaginary cylinder.

16. The wiper blade assembly of claim 10 in which the other one of said spaced sides has an aperture in alignment with the aperture of said one side of the bridge member which has a second guiding means therefor substantially identical with the first mentioned guiding means.

17. The wiper blade assembly of claim 10 in which said guiding means functions as a bearing surface for the end portion of the arm when the pin is inserted through the aperture.

* * * * *